United States Patent
Lavoie et al.

(10) Patent No.: US 8,602,508 B2
(45) Date of Patent: Dec. 10, 2013

(54) BRAKE PRESSURE APPLY

(75) Inventors: Erick Lavoie, Dearborn, MI (US);
Thomas Salmon, Rochester, MI (US);
Keith Mattson, Tower, MN (US)

(73) Assignee: Ford Global Technologies, Dearborn, MI (US)

( * ) Notice: Subject to any disclaimer, the term of this patent is extended or adjusted under 35 U.S.C. 154(b) by 1133 days.

(21) Appl. No.: 11/427,838

(22) Filed: Jun. 30, 2006

(65) Prior Publication Data

US 2008/0001477 A1    Jan. 3, 2008

(51) Int. Cl.
*B60T 8/60*    (2006.01)
(52) U.S. Cl.
USPC ............................. 303/155; 701/78; 701/83
(58) Field of Classification Search
USPC .......... 303/3, 146, 147, 148, 155; 701/38, 78, 701/83
See application file for complete search history.

(56) References Cited

U.S. PATENT DOCUMENTS

| | | | |
|---|---|---|---|
| 4,867,281 A | 9/1989 | Sullivan | |
| 5,743,600 A | 4/1998 | Yasuda et al. | |
| 5,806,938 A | 9/1998 | Stumpe et al. | |
| 6,219,610 B1 * | 4/2001 | Araki | 701/72 |
| 6,238,011 B1 * | 5/2001 | Heckmann | 303/20 |
| 6,293,370 B1 * | 9/2001 | McCann et al. | 188/71.8 |
| 6,481,805 B1 | 11/2002 | Ichinose et al. | |
| 6,748,310 B2 * | 6/2004 | Tamasho et al. | 701/70 |
| 6,963,797 B2 * | 11/2005 | Salib et al. | 701/45 |
| 6,969,126 B2 * | 11/2005 | Ichinose et al. | 303/11 |
| 7,034,673 B2 * | 4/2006 | Buschmann et al. | 340/453 |
| 7,416,263 B2 * | 8/2008 | Schmitt | 303/146 |
| 7,527,339 B2 * | 5/2009 | Iizuka et al. | 303/11 |
| 2005/0046272 A1 | 3/2005 | Rieth et al. | |

* cited by examiner

*Primary Examiner* — Thomas J Williams
*Assistant Examiner* — Mariano Sy
(74) *Attorney, Agent, or Firm* — Angela M. Brunetti; Raymond L. Coppiellie

(57) ABSTRACT

A method for brake pressure apply in a hydraulic brake system includes commanding a cage clearance reduction phase and commanding a wheel control phase subsequent to the cage clearance reduction phase. Accordingly, the cage clearance is reduced prior to entering the wheel control phase. A method for cage clearance reduction in a hydraulic brake system for roll stability control is also provided.

8 Claims, 3 Drawing Sheets

BRAKE PRESSURE APPLY

TECHNICAL FIELD

The present invention is related to a method for brake pressure apply and more particularly directed to brake pressure pulsing to achieve error reduction in a brake pressure command.

BACKGROUND

Brake controllers typically use pressure control as part of antilock, traction and/or stability control systems. The accuracy of the pressure control is in part affected by the compliance within the brake control system, such as the compliance of each brake connected to the hydraulic system as controlled by the electronic controller. The compliance is also influenced by pressure versus volume relationship as manifested within the brake hydraulic system when actuating the mechanical connection by the hydraulic. Resultantly, variation in the pressure versus volume relationship, including other compliance effects, may exhibit minor changes such as in a pressure control estimation employed when using pressure control. Accordingly, it is desirable to improve the pressure control estimation by refining control or responsiveness.

Representatively, FIGS. 1 and 2 show a graph of pressure control for a rear left brake having a 0.3 mm cage clearance and a 0.7 mm cage clearance, respectively. Cage clearance is generally a measure of the linear difference between the outer diameter of the shoes and the inner diameter of the drum when there is no pressure control acting on the brakes. A pressure control estimate 11 is determined for a particular vehicle by modeling or by empirical testing and determination, whereby pressure control may be achieved by implementing a pressure control request 12 in a brake controller in order to achieve the desired pressure control estimate. When the brake controller implements the pressure control request 12, an actual pressure control of the brake is achieved as manifested by a pressure control measured response 13. It is recognized that the actual response 13 is determined by utilizing a pressure sensor in a test vehicle and may not be observable in a vehicle utilizing the invention to advantage because the invention necessarily eliminates the need for pressure transducers otherwise required for pressure control. The pressure control measured response 13, when compared to the desirable pressure control estimate 11 as shown in FIG. 1, results in a 26.5% mean pressure estimate error 14. The mean pressure estimate error is the average of the error between the actual pressure and the estimate pressure. The pressure control measured response 13, when compared to the desirable pressure control estimate 11 as shown in FIG. 2, results in a 267% mean pressure estimate error 15. Illustratively, only a 0.4 mm change in cage clearance causes an additional 241% error in the pressure control. Therefore, changes in cage clearance can affect braking performance and pressure control.

Therefore, there is a desire to provide refined pressure control with more accurate pressure estimation.

SUMMARY

Accordingly, a method for brake pressure apply in a hydraulic brake system is provided. The method advantageously reduces the effects of cage clearance, including the associated cage clearance dynamics.

A method for brake pressure apply in a hydraulic brake system includes commanding a cage clearance reduction phase and commanding a wheel control phase subsequent to the cage clearance reduction phase. Accordingly, the error caused by cage clearance is reduced in the wheel control phase.

A method for cage clearance reduction in a hydraulic brake system for roll stability control is also provided.

Other advantages and features of the present invention will become apparent when viewed in light of the detailed description of the embodiments when taken in conjunction with the attached drawings and appended claims.

DETAILED DESCRIPTION OF THE PREFERRED EMBODIMENT

Figure 1:
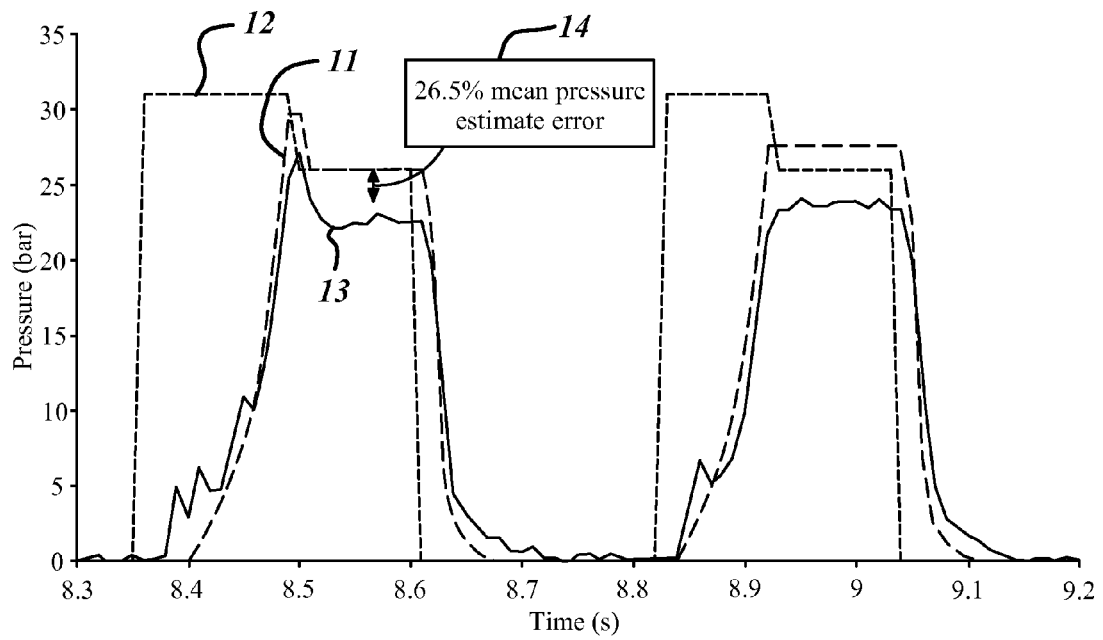
FIG. 1 shows a graph of pressure control for a rear left brake having a 0.3 mm cage clearance.
Figure 2:
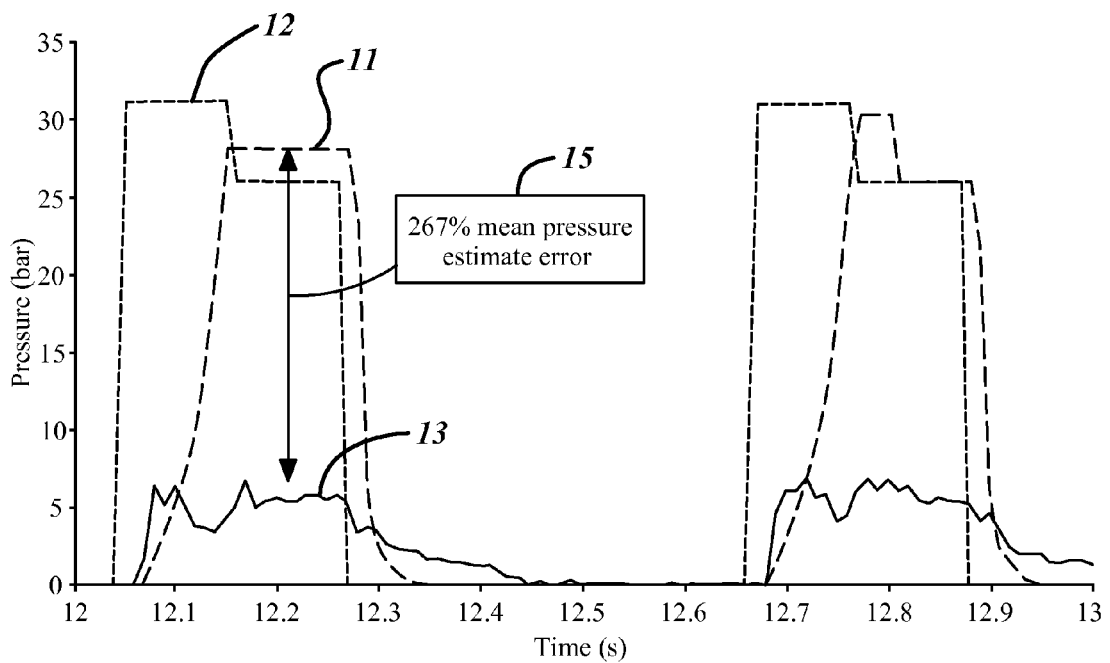
FIG. 2 shows a graph of pressure control for a rear left brake having a 0.7 mm cage clearance.

The invention provides a method for refined pressure control. In particular, the invention provides a refinement to pressure control when affected by differing cage clearance or different pressure versus volume relationships required to bring a shoe into braking contact with a drum in order to achieve a desired pressure control. While pressure transducers may be utilized for pressure control, it is desirable for the above-mentioned reasons to eliminate or not require the pressure transducers. Therefore, in order to have pressure control, a pressure estimate is implemented by the controller, such as the pressure estimate utilized by a roll stability control ("RSC") system for each wheel of interest.

Cage clearance is generally defined as a measure of the linear difference between the outer diameter of the shoes and the inner diameter of the drum when there is no pressure control acting on the brakes. Optionally, cage clearance may be defined be as the difference between a brake drum and a brake shoe. Furthermore, cage clearance may be defined as the mechanical force required to bring a brake drum into contact with a brake shoe.

The pressure estimate is a function of a fluid flow estimate. The fluid flow estimate is a function of the pressure estimate. Because the fluid flow estimate is explicably tied to the pressure estimate, careful execution of the pressure estimate by the controller is required if control is to be appropriately achieved. Adding to this complexity, drum brakes are less reactive when controlled by a controller using the pressure estimate when compared to a system using feedback pressure control. Drum brakes are sensitive because of variation in the cage clearance and the associated cage-drum dynamics. The cage clearance variation is manifested primarily by changes in the volume of fluid required or consumed when moving the shoe against the drum. The dynamics variation is manifested in the operating region where the friction surfaces of the drum and shoe are not in contact with each other.

Additionally, the pressure estimate is affected by the brake's volumetric stiffness. For example, the volumetric stiffness of the shoe when it is not in contact with the drum may be on the order of 4-8 bar/cm3, while volumetric stiffness after the shoe contacts the drum may be on the order of 400-800 bar/cm3 (these degrees of magnitude will vary depending upon the application). As a result, when fluid is pumped into the brakes, the pressure rise is greater per unit volume after the shoe makes contact with the drum. Conversely, when a release valve holding the pressure in a given wheel is opened, the fluid release is at a greater rate when the drum and shoe are still pressed against each other.

Furthermore, the pressure estimate is affected by the cage-drum dynamics. The drum brakes are affected by a self-energizing action caused by the rotation of the drum relative to the shoe. This self-energizing action introduces a force component that acts to help press or hold the shoe against the drum. This self-energizing action is overcome as the inertial effects decrease as the shoe returns to its non-contact or resting clearance position. The inertial effect is influenced by the pressure release, i.e., the compliance effect of pressure versus volume relationship in the pressure release valve as described in U.S. patent application Ser. No. 11/381,166 filed May 2, 2006, by the same assignee, entitled "METHOD TO ACHIEVE PRESSURE CONTROL ROBUSTNESS IN BRAKE CONTROL SYSTEMS," incorporated herein by reference.

Taking advantage of the observed behavior allows for control of the pressure command to reduce the effective clearance between the shoe and the drum of a brake prior to exerting control over the wheel of interest. As a result, the variation in the pressure model due to the dynamics of the drum brake system in the region of operation where the shoe is not in contact with the drum may be significantly reduced. Accordingly, a pressure profile may be designed by taking advantage of the dynamics mentioned above, thereby allowing for pressure control of a hydraulic brake system, such as an RSC, without the added cost and complexity explicably required when using pressure transducers in order to reduce error.

Figure 3:
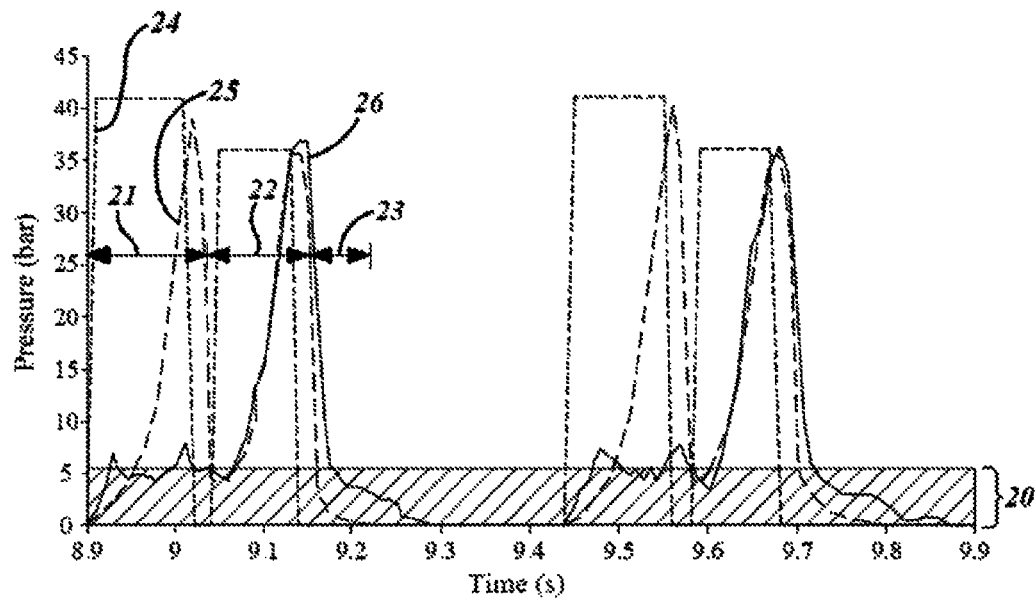
FIG. 3 shows a graph of pressure control for a rear left brake, having a 0.7 mm cage clearance, utilizing a cage clearance reduction phase for enhancing roll stability control.

FIG. 3 shows a graph of pressure control for a rear left brake, having a 0.7 mm cage clearance, utilizing a cage clearance reduction phase 21 for enhancing roll stability control. The brake controller enters the cage clearance reduction phase 21 prior to entering a wheel control phase 22 by supplying a pressure control request 24, which would substantially result in a pressure control estimate 25 if the compliance or cage clearance dynamics 20 were overcome. A measure of the actual pressure control expected is shown by a representative pressure control measured response 26. The brake controller may then enter the wheel control phase 22, wherein the commanded pressure control request 24 results in the desired or measured response 26 approximating the control estimate 25 because the cage clearance dynamics 20 have been minimized by the cage clearance reduction phase. The wheel control phase 22 is followed by an inertial phase 23 in which the cage clearance dynamics 20 are overcome until the inertia of the system dissipates. It is also recognized, that the cage clearance reduction phase 21 inherently includes inertial phases depending upon the type, size and duration of pressure builds and releases while achieving cage clearance reduction error. Accordingly, the wheel control phase 22 may follow the cage clearance reduction phase within a given time lag to achieve the same effectiveness.

Figure 4:
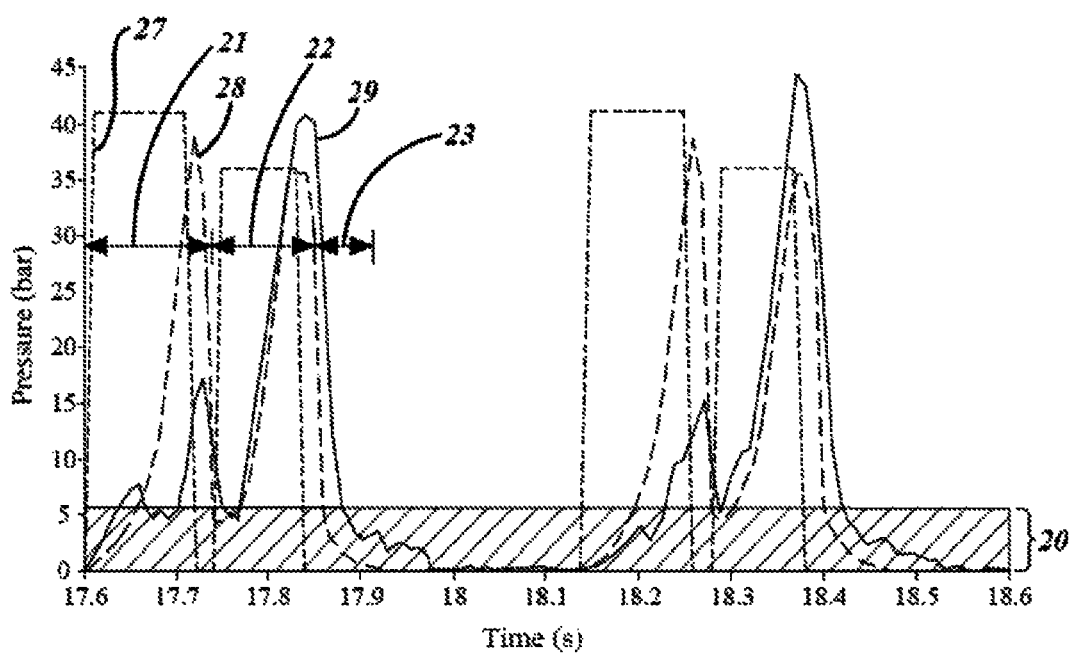
FIG. 4 shows a graph of pressure control for a rear left brake, having a 0.3 mm cage clearance, utilizing a cage clearance reduction phase for enhancing roll stability control.

Like FIG. 3, FIG. 4 shows a graph of pressure control for a rear left brake, but having a 0.3 mm cage clearance, utilizing a cage clearance reduction phase 21 for enhancing roll stability control. A pressure control response 29 is achieved by implementing a pressure control request 27 to obtain a pressure control estimate 28 in the brake control system by first entering the cage clearance reduction phase 21 before entering the wheel control phase 22. While the cage clearance differs by 0.4 mm in FIGS. 3 and 4, the mean pressure estimate error is substantially reduced, thereby minimizing the error effect in open loop pressure control caused by differing cage clearances.

Accordingly, the effective drum brake cage clearance reduction phase promotes closer agreement between the pressure estimate and the actual pressure. It is expected that the cage clearance reduction phase pressure profile may be used throughout the operating range of the cage clearance. When the results are compared for the 0.7 mm cage clearance to the 0.3 mm cage clearance, the difference in the pressure estimate error is approximately 3.7 percent during the wheel control phase. This illustrates that the brake hydraulics, for this wheel, experiences a pronounced increase in volumetric stiffness earlier in the effective cage clearance reduction phase when there is less clearance between it and the drum. Consequently, the drum brake experiences significantly higher pressure during this phase for a similar amount of fluid flow. This may be managed in part by releasing pressure in the brake for a strategic amount of time prior to entering the wheel control phase. When the valve is opened to release pressure in the brake, the pressure drops substantially quicker than when the same action was commanded with the shoe at a higher cage clearance because there is more pressure in the brake acting against a relatively stiff influence. As a result, the pressure in the brake and the clearance between the shoes and the drum are closer over the range of initial cage clearance when a pressure increase is subsequently commanded during the wheel control phase. Advantageously, there may be additional time lag before the shoes return to their initial cage clearance due to the self-energizing effect between the friction surfaces when there is relative motion between the shoes and the drum.

This illustrates that a series of pressure commands, i.e., pressure builds or releases, may be fashioned to reduce the effective cage clearance and therefore reduce the error of the pressure estimate. The design of a pressure command in the effective cage clearance reduction phase coordinated with another pressure command in wheel control phase required for RSC allows a usable pressure estimate to be advantageously utilized during the wheel control phase even when there is variability in the cage clearance.

Figure 5:
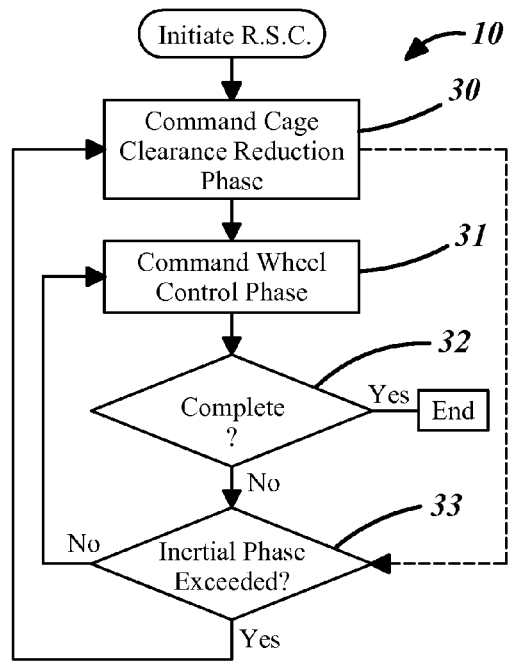
FIG. 5 is a block diagram showing a method for RSC in a brake control system according to a first embodiment of the invention.

FIG. 5 is a block diagram showing a method for RSC in a brake control system 10 according to a first embodiment of the invention. The invention is presented for convenience for use with RSC but may be used to advantage in any other hydraulic brake system. Initially, after the RSC is initiated, a cage clearance reduction phase 30 is commanded. The cage clearance reduction phase 30 may include a pressure build or increase followed by a pressure dump or decrease, or series of pressure builds and or dumps, wherein the cage clearance is reduced or minimized prior to receiving a pressure command in the wheel control phase 31. The cage clearance reduction phase 30 takes advantage of the compliance or cage clearance dynamics mentioned above to neutralize or diminish the effect of changing cage clearances, thereby achieving improved pressure control response in response to the pressure control request premised upon the pressure control estimate when executing the wheel control phase 31. After the wheel control phase 31 is commanded, a decision block 32 is entered to determine whether the RSC is complete and if so, the RSC is completed for the wheel of interest. If the decision block 32 is not completed, then decision block 33 is executed, wherein a determination of whether the inertial phase is exceeded. If the inertial phase is exceeded the method is returned to the cage clearance reduction phase 30. If the inertial phase is not exceeded, i.e., the clearance is still substantially reduced due to inertial effects, the method is returned to the wheel control phase 31, wherein RSC may again be applied.

It is recognized that duration and magnitude for each pressure build is determined by testing for a particular vehicle and implementable in the brake control system according to the invention. Also, the inertial phase duration may be empirically determined for a particular vehicle.

Optionally, decision block 33 may be implemented prior to entering the wheel control phase 31.

It is also recognized that the brake control system 10 may be implemented at different times and in different ways for each wheel, independently.

Figure 6:
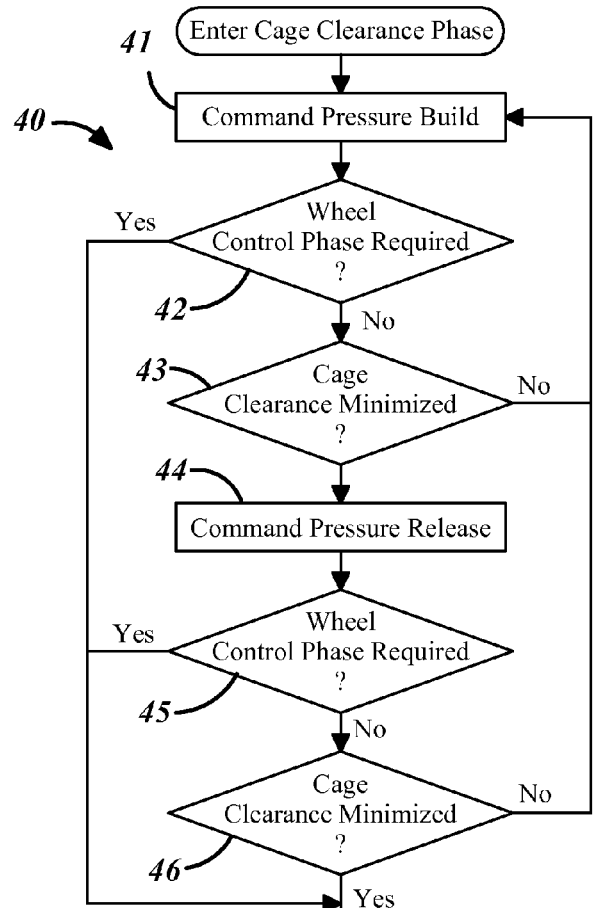
FIG. 6 is a block diagram showing a second embodiment of a method for cage clearance reduction phase according to the invention.

FIG. 6 is a block diagram showing a second embodiment of a method for cage clearance reduction phase 40 according to the invention. After entering the cage clearance reduction phase 40, a pressure build 41 is commanded. The pressure build 41 is a pressure step having magnitude and duration, but it is recognized that the pressure build may have any other form such as a ramp function, without limitation, that would be recognized by a person of skill. After the pressure build 41 is commanded, decision block 42 may be entered to determine whether a wheel control phase is required, and if so, the cage clearance reduction phase is completed and the brake control system continues. If the wheel control phase is not required, then decision block 43 may be entered to determine whether the cage clearance is minimized. The cage clearance reduction phase is returned to the command pressure build 41 if the cage clearance is not minimized. If the cage clearance is minimized then the cage clearance reduction phase continues to a command pressure release 44.

The pressure release 44 is commanded to provide pressure reduction in the brake from the command pressure build thereby minimizing braking force affect before it is required by the RSC, while taking advantage of the inertial and compliance effects within the brake to decrease cage clearance. The pressure release 44 is a pressure step having magnitude and duration, but it is recognized that the pressure release may have any other form such as a ramp function, without limitation, that would be recognized by a person of skill. After the pressure release 44 is commanded, decision block 45 may be entered to determine whether a wheel control phase is required, and if so, the cage clearance reduction phase is completed and the brake control system continues. If the wheel control phase is not required, then decision block 46 may be entered to determine whether the cage clearance is minimized. The cage clearance reduction phase is returned to the command pressure build 41 if the cage clearance is not minimized. If the cage clearance is minimized then the cage clearance reduction phase is completed and the brake control system continues.

Optionally, decision blocks 43 and 46 may be determined by testing to obtain the criterion for a particular vehicle that is then implemented in the RSC to determine whether the criterion is met. The criterion may, for example, be determined by satisfying particular thresholds such as commanded pressure build, pressure release, pressure duration or inertial lag, without limitation. Also, decision blocks 43 and 46 may be determined by utilizing a sensor to determine cage clearance, by measuring fluid displacement rate in the brake system, or by monitoring the change in volumetric stiffness in the brake system.

It is to be understood that the configuration for pressure build and release will depend upon the particular system to which it is implemented. In this regard, generally, the invention may be tailored to various drum brake designs and implemented for mass production by designing and/or calibrating the pressure request to the drum brake system of interest. Calibration may be accomplished by measuring the actual pressure in the drum brake assembly or by measuring the cage clearance during test pressure commands. The pressure commands may be a function of time and/or the pressure estimate.

The calibration to determine the builds or pulse train required for implementation may be designed to determine as follows: 1. Pressure increase command designed such that the shoe comes into contact with the drum at the maximum expected cage clearance. At the same time, this pressure command should not be intrusive to the driver when the drum brake system is at its minimum expected cage clearance. 2. Pressure decrease command such that the inertia of the shoe assembly would not allow it to reach the maximum expected cage clearance during the release before more brake fluid is pumped for the subsequent build phase, resulting in a reduced effective cage clearance.

Alternatively, the method above may include measuring the cage clearance and using this signal to calculate the fluid flow needed to bring the shoe in contact with the drum or until there is a significant change in the volumetric stiffness. Also, the shape of the pump current may be used to estimate when the shoe has made contact with the drum.

While particular embodiments of the invention have been shown and described, numerous variations and alternate embodiments will occur to those skilled in the art. Accordingly, it is intended that the invention be limited only in terms of the appended claims.

What is claimed is:

1. A method for brake pressure apply in a hydraulic brake system comprising:
    commanding a cage clearance reduction phase as a series of pressure increases and decreases while a measured pressure is greater than zero and until the measured pressure matches a pressure control estimate during the cage clearance reduction phase; and
    commanding a wheel control phase subsequent to the cage clearance reduction phase, wherein a cage clearance is reduced prior to said commanding of the wheel control phase.

2. The method of claim 1 wherein the cage clearance reduction phase and the wheel control phase are initiated during a roll stability control ("RSC").

3. The method of claim 2 further comprising determining whether the RSC is complete.

4. The method of claim 3 further comprising determining whether an inertial phase is exceeded when the RSC is not complete, the inertial phase being a phase during the cage clearance reduction phase during which time a brake system inertia is dissipated.

5. The method of claim 4 wherein said commanding the cage clearance reduction phase is in response to said determining whether the inertial phase is exceeded.

6. The method of claim 1 further comprising determining whether an inertial phase is exceeded, the inertial phase being a phase during the cage clearance reduction phase during which time a brake system inertia is dissipated.

7. The method of claim 6 wherein said commanding the cage clearance reduction phase is in response to said determining whether an inertial phase is exceeded.

8. The method of claim 6 wherein said commanding the wheel control phase s in response to said determining that the inertial phase is not exceeded.

* * * * *